Jan. 15, 1935. E. F. BURDETTE 1,988,415

FLEXIBLE TROLLEY POLE HEAD

Filed July 6, 1932

Inventor
E. F. Burdette.

By
Bryant
Attorney

Patented Jan. 15, 1935

1,988,415

UNITED STATES PATENT OFFICE 1,988,415

FLEXIBLE TROLLEY POLE HEAD

Ernest F. Burdette, Akron, Ohio, assignor of one-half to Frank P. Obenchain, Cleveland, Ohio Application July 6, 1932, Serial No. 621,106

2 Claims. (Cl. 191—64)

This invention relates to certain new and useful improvements in flexible trolley pole heads.

The primary object of the invention is to provide a flexible trolley pole head wherein the head is formed of rubber with the flexible rubber head and pole especially designed for use in connection with a mine locomotive.

At present, mine locomotives are equipped with rigid trolley poles and heads and as the locomotive travels backwardly and forwardly through the mines, the trolley wheel frequently escapes the trolley wire and moves into engagement with the mine roof which presents uneven surfaces and obstructions resulting in breaking of the poles and heads, delays in service and expensive repair work. It is therefore an important object of this invention to provide a flexible head for a rigid trolley pole especially designed for use in connection with mine locomotives, the head being constructed of flexible rubber of a character to permit excessive bending of the head when obstructions are encountered with such impacts absorbed by the flexible rubber head and eliminating damage to the rigid trolley pole.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1:
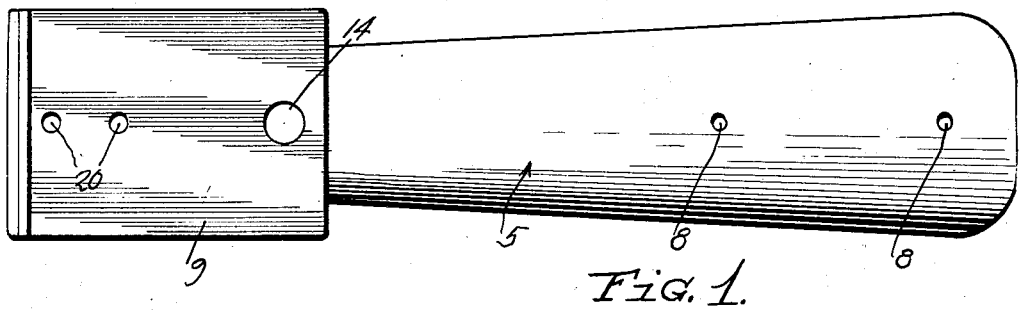
Figure 1 is a top plan view of the trolley head with the bronze support for the trolley wheel attached to the upper end thereof.
Figure 2:
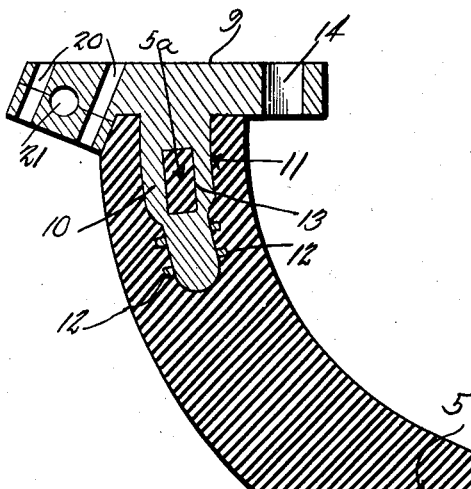
Figure 2 is a vertical longitudinal sectional view of the head showing the trolley wheel support set into the upper end of the head and the lower socketed end to be received on the upper end of the rigid trolley pole.
Figure 2:
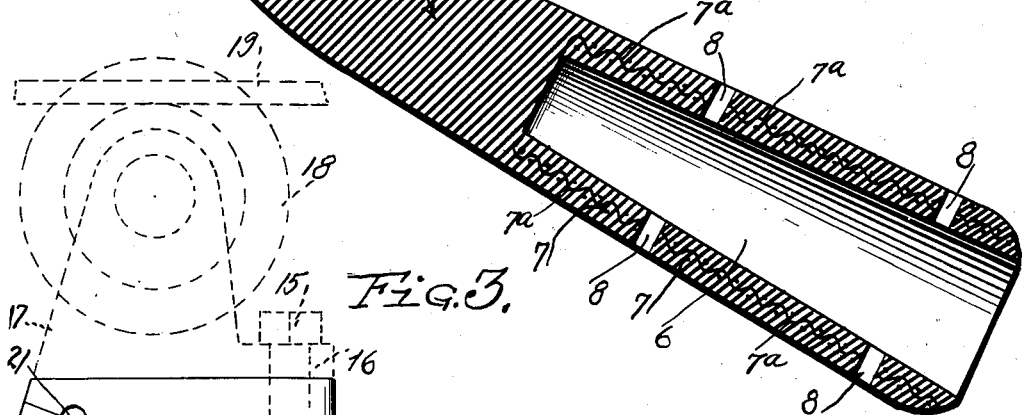

Referring more in detail to the accompanying drawing, the reference numeral 5 designates a flexible rubber trolley pole head that is of the same general shape and design as the rigid head, but being sufficiently flexible to permit excessive bending of the head when the trolley wheel escapes the trolley wire and the wheel encounters an obstruction to prevent breakage of the trolley pole and associated parts. The lower end of the flexible rubber head 5 is provided with a relatively deep tapering socket 6 with the wall 7 surrounding the socket reinforced and strengthened by inserts 7a during moulding of the head, such as cotton fabric or the like. The wall 7 surrounding the socket 6 is provided with transverse openings 8 through which fastening elements are adapted to be inserted for engagement with the upper end of a trolley pole inserted in the socket to retain the head on the pole.

Figure 3:
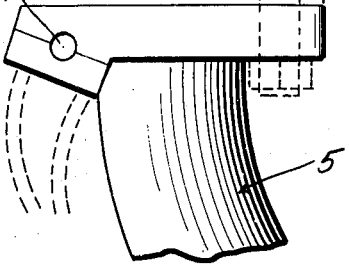
Figure 3 is a fragmentary side elevational view of the upper end of the head, trolley wheel and wire illustrated by dotted lines.

A trolley wheel support is mounted on the upper end of the flexible head 5 and comprises a rectangular metal plate, preferably formed of bronze carrying a centrally depending leg 10 set into a cavity 11 formed in the upper end of the head 5 with lugs 12 projecting outwardly of the leg to retain the latter in the recess 11 while the leg 10 is provided with a transverse opening 13 into which the part 5a of the rubber head extends to form an interlocking connection between the flexible rubber head and trolley wheel support. The support for the trolley wheel extends laterally of the upper end of the flexible rubber head 5 and at one end thereof is provided with an opening 14 for the passage of a bolt 15 shown by dotted lines in Figure 3 as passing through a lug 16 carried by a bracket 17 that rotatably supports the trolley wheel 18 moving in contact with the trolley wire 19. The opposite side of the trolley wheel support is provided with a pair of spaced openings 20 for conductors extending from the trolley wheel and a cross-opening 21 for the attachment of a pull rope for the trolley pole and the head.

While the flexible trolley pole head has been described as especially designed for use in connection with mine locomotives, it is to be understood that the same may be used on electric trolley locomotives of any character, the principal feature of the invention residing in the provision of a flexible trolley pole head formed of rubber that is capable of acting to a considerable degree for the elimination of injury to the rigid trolley pole. The flexible trolley pole head is especially desired for use in connection with poles carried by locomotives subject to backward travel without reversing the position of the pole upon the locomotive so that should the trolley wheel escape the trolley wire, any obstructions encountered by the trolley wheel, and the head will be absorbed by the head by a bending action with damage to the rigid trolley pole eliminated.

While there is herein shown and described the preferred embodiment of the invention, it is nevertheless to be understood that minor changes may be made therein without departing from the spirit and scope of the invention as claimed.

I claim:

1. In a trolley pole, a head formed of flexible rubber having a socket in one end for attachment to a rigid pole, a metallic trolley wheel support on the other end of the head, and an interlocking connection between the head and trolley wheel support including a recess in the upper end of the head and a leg depending from the support having an interlocking connection with the walls of the recess.

2. In a trolley pole, a head formed of flexible rubber having a socket in one end for attachment to a rigid pole, a metallic trolley wheel support on the other end of the head, a fabric reinforcing element embedded in the wall of the head surrounding the socket, and an interlocking connection between the head and trolley wheel support including a recess in the upper end of the head and a leg depending from the support having an interlocking connection with the walls of the recess.

ERNEST F. BURDETTE.